(12) United States Patent
Jesse

(10) Patent No.: US 9,221,382 B1
(45) Date of Patent: Dec. 29, 2015

(54) STRAP EDGE GUARD

(71) Applicant: Perry Jesse, Crystal Lake, IL (US)

(72) Inventor: Perry Jesse, Crystal Lake, IL (US)

( * ) Notice: Subject to any disclaimer, the term of this patent is extended or adjusted under 35 U.S.C. 154(b) by 0 days.

(21) Appl. No.: 14/450,695

(22) Filed: Aug. 4, 2014

(51) Int. Cl.
*B60P 7/08* (2006.01)

(52) U.S. Cl.
CPC .................... *B60P 7/0869* (2013.01)

(58) Field of Classification Search
CPC ............................. B60P 7/0869; B60P 7/0823
USPC ............................................ 410/41, 99, 155
See application file for complete search history.

(56) References Cited

U.S. PATENT DOCUMENTS 4,525,113 A * 6/1985 Colman ........................ 410/41
2006/0108249 A1 * 5/2006 Riddleburgh et al.

* cited by examiner

*Primary Examiner* — Stephen Gordon
(74) *Attorney, Agent, or Firm* — The Law Office of Jerry D. Haynes

(57) ABSTRACT

An edge guard to provide a barrier between a strap and a load comprising an angled plate, where the angled plate includes a first portion and a second portion that meet at a corner; tabs attached to the first portion of the angled plate, where the tabs receive the strap, and where the strap is positioned between tabs and the angled plate; and bolts to secure tabs to the angled plate.

5 Claims, 1 Drawing Sheet

STRAP EDGE GUARD

BACKGROUND OF THE INVENTION

1. Field of the Invention

The present invention relates to a guard that protects a strap from fraying or cutting when passing over the edge of a load.

2. Description of Related Art

Those in the trucking, moving and other transporting fields continuously move heavy loads on their vehicles. Depending on the size and weight of the load, bungee cords, twine or nylon straps are used to tie-down the load and prevent it from sliding during transport. For especially heavy loads, nylon straps are used with a ratchet to tighten the strap beyond what a person can manually pull. Because of the tension and requirement for a taut strap, the straps are often prone to fraying, wearing and tearing after repeatedly rubbing against sharp objects or abrasive surfaces. The edge of the load, container or box scrapes against the strap which may lead to a dangerous situation if the strap loosens or breaks.

On the market there are a few products that may help a user to prevent strap wear during transport. These items fit against the corner of the container as a shield between the load and the strap. For example, U.S. Pat. No. 8,505,467 by Ronald Bruce Roberts discloses a product protection guard. The guard is a device that includes multiple holes and is placed on the corner of a portable platform. A cord or strap is laced through the holes to secure the load on the platform. While these products provide some assistance, they often are made from plastic or cardboard so over time they themselves become worn, thereby defeating their purpose and eventually damaging the strap.

Therefore it would be beneficial in the art to provide a device that protects a strap when tying-down a load. It would also be desirable in the art to provide a device that is able to withstand heavy duty tension without deforming or breaking.

SUMMARY OF THE INVENTION

In view of the foregoing disadvantages inherent in the prior art, the general purpose of the present invention is to provide an edge guard to provide a barrier between a strap and a load, configured to include all of the advantages of the prior art, and to overcome the drawbacks inherent therein.

Accordingly, an object of the present invention is to provide a strap edge guard to protect a strap when tying-down a load.

Another object of the present invention is to provide a strap edge guard with two tabs that secure the strap upon the guard thereby preventing shifting or fraying during use.

To achieve the above objects, in an aspect of the present invention, an edge guard is described comprising an angled plate, where the angled plate includes a first portion and a second portion that meet at a corner; a pair of tabs attached to the first portion of the angled plate, where the tabs receive the strap, and where the strap is positioned between pair of tabs and the angled plate; and a pair of means to secure the pair of tabs to the angled plate, where the pair of means to secure are positioned at a lateral edge of the pair of tabs to prevent the strap from escaping the pair of tabs.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a guard that protects a strap from fraying or cutting when passing over the edge of a load. The present invention provides a strap edge guard to preserve the integrity of loading straps. The strap edge guard is an L-shaped plate that fits to the corner of a structure or load. The plate includes a pair of tabs that receive the strap. The tabs keep the strap coupled against the guard to prevent sliding and removal during use. With the strap edge guard the user is afforded a product that protects the strap thereby preventing costly damage while transporting a load.

Figure 1:
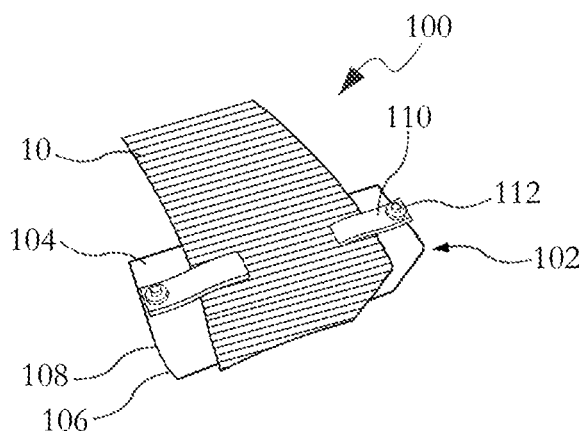
FIG. 1 depicts a perspective view of a strap edge guard in accordance with an exemplary embodiment of the present invention.

Turning now descriptively to the drawings, referring to FIG. 1, a strap edge guard 100 is shown in accordance with an exemplary embodiment of the present invention. The strap edge guard 100 comprises an angled plate 102 that comprises a first portion 104 and a second portion 106 that join together at a corner 108. The angled plate 102 may be L-shaped where the first portion 104 and the second portion 106 create a 90 degree angle. More obtuse or acute angles may be created depending on the structure of the load or items that may be transported. The angled plate 102 may be made from metal like aluminum or steel use in industrial transport. Alternatively, plastic, wood or cardboard may be used to create the angled plate 102 to provide a lightweight guard useful when transporting lightweight loads.

On the first portion 104 may be a pair of tabs 110 which are secured at a lateral edge with a pair of securing means 112. The tabs 110 face each other to receive a strap 10 which passes beneath them and over the corner 108. The tabs 110 may have beveled edges and a smooth underside to prevent fraying or damage to the strap, and to enable easy sliding of the strap beneath the tabs 110. The strap 10 may be a nylon or fabric securing strap, a plastic tie-down strap, string, twine, bungee cord or another similar strap used to tie-down a structure. The securing means 112 may be bolts, pins or welding joints to provide a strong and permanent attachment of the tabs 110 against the plate 102.

Figure 2:
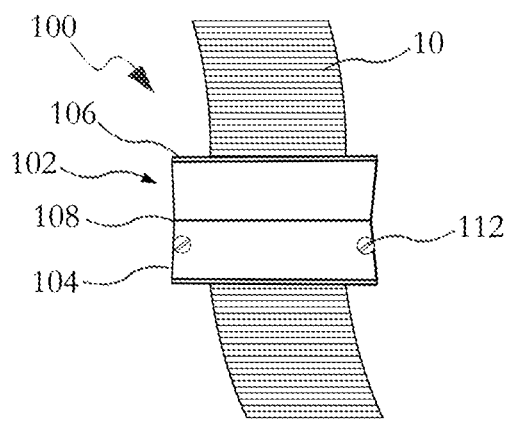
FIG. 2 depicts a bottom view of a strap edge guard in accordance with an exemplary embodiment of the present invention.

Referring now to FIG. 2, a bottom view of the strap edge guard 100 is shown in accordance with an exemplary embodiment of the present invention. The securing means 112 as a bolt or pin passes all the way through the tabs 110 and the angled plate 102 to the underside of the first portion 104 for a strong, secure coupling.

Figure 3:
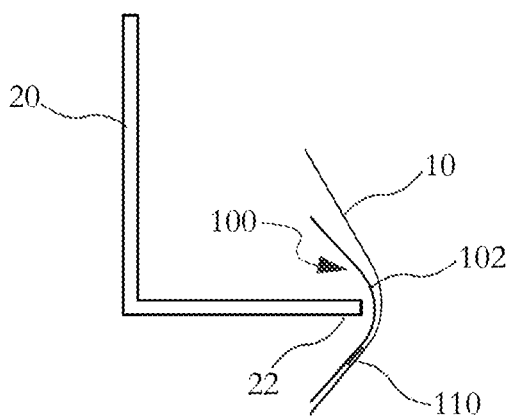
FIG. 3 depicts a side view of a strap edge guard in accordance with an exemplary embodiment of the present invention.

Referring to FIG. 3 a side view of the strap edge guard 100 is shown as the angled plate 102 passes over an edge 22 of a structure 20. The strap edge guard 100 provides a barrier between the strap and the edge 22 of the structure 20 to prevent damage to the strap 10. With the strap edge guard 100 the user is provided a tool that protects the strap 10 when tying against a load. This is especially useful for very tight tie-down fastening like with use with a ratchet strap where the ratchet secures the strap very taut but the tension may cause damage to the strap over time. The strap edge guard 100 fastens to the strap 10 and then may be positioned on the load before tightening. The guard 100 allows the strap 10 to easily pass over the corner of the load to ensure a taut, strong fit during transport.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An edge guard to provide a barrier between a strap and a load comprising:
   a. an angled plate, where the angled plate includes a first portion and a second portion that meet at a corner;
   b. a first tab on the first portion, where the first tab includes a beveled edge;
   c. a second tab on the first portion, where the second tab includes a beveled edge, further wherein the first tab and second tab are aligned with spacing between the first tab and second tab to receive the strap;
   d. a first bolt, where the first bolt secures the first tab to the first portion; and
   e. a second bolt, where the second bolt secures the second tab to the first portion.

2. The edge guard according to claim 1, where the first portion and the second portion of the angled plate create a 90 degree angle.

3. The edge guard according to claim 1, where the first portion and the second portion of the angled plate create an obtuse angle.

4. The edge guard according to claim 1, where the first portion and the second portion of the angled plate create an acute angle.

5. The edge guard according to claim 1, where the angled plate is made from one of metal, plastic, cardboard or wood.

\* \* \* \* \*